US009129089B2

(12) United States Patent
DiAcetis

(10) Patent No.: US 9,129,089 B2
(45) Date of Patent: Sep. 8, 2015

(54) DIGITAL RIGHTS MANAGEMENT WITH PERSISTENTLY-UNENCRYPTED CONTENT

(75) Inventor: Stephen P. DiAcetis, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1869 days.

(21) Appl. No.: 12/359,959

(22) Filed: Jan. 26, 2009

(65) Prior Publication Data

US 2010/0191969 A1 Jul. 29, 2010

(51) Int. Cl.
*H04L 9/32* (2006.01)
*G06F 21/10* (2013.01)

(52) U.S. Cl.
CPC ...................... *G06F 21/10* (2013.01)

(58) Field of Classification Search
CPC ........................................ G06F 21/10
USPC ................. 705/59; 713/171; 726/26
See application file for complete search history.

(56) References Cited

U.S. PATENT DOCUMENTS

| | | | |
|---|---|---|---|
| 7,343,297 B2 | 3/2008 | Bergler et al. | |
| 7,389,273 B2* | 6/2008 | Irwin et al. ...................... | 705/59 |
| 7,496,540 B2* | 2/2009 | Irwin et al. ...................... | 705/59 |
| 7,962,750 B1* | 6/2011 | Gruse et al. .................... | 713/171 |
| 2003/0182559 A1* | 9/2003 | Curry et al. .................... | 713/189 |
| 2006/0069650 A1* | 3/2006 | Hori ................................ | 705/57 |
| 2006/0107330 A1* | 5/2006 | Ben-Yaacov et al. ........... | 726/26 |
| 2006/0167808 A1* | 7/2006 | Greene et al. .................. | 705/59 |
| 2008/0109911 A1* | 5/2008 | Tedesco et al. ................. | 726/30 |
| 2008/0154633 A1* | 6/2008 | Ishibashi et al. ................ | 705/1 |
| 2009/0165141 A1* | 6/2009 | Kakehi et al. .................. | 726/26 |
| 2010/0142710 A1* | 6/2010 | Chrysler et al. ............. | 380/277 |

OTHER PUBLICATIONS

Theresa A. Pardo; Realizing the Promise of Digital Government: It's More thanBuilding a Web Site;Oct. 2000;udayton.edu; pp. 1-17.*
"Microsoft Announces Breakthrough Technology Enabling Simple Access to Broad Set of Digital Content, Including Music, Games, Video, Ring Tones and Pictures", Retrieved at <<http://www.microsoft.com/presspass/press/2007/feb07/02-123GSMNewTechnologyPR.mspx>>, Microsoft, Feb. 12, 2007, pp. 3.
Kwok, Sai Ho, "Digital Rights Management for the Online Music Business", Retrieved at <<http://www.sigecom.org/exchanges/volume_3/3.3-Kwok.pdf, ACM SIGecom Exchanges, vol. 3, No. 3, Aug. 2002, pp. 17-24.
"Building an XMR License", Retrieved at <<http://msdn.microsoft.com/en-us/library/aa384528(VS.85).aspx>>, Nov. 26, 2008, p. 1.

(Continued)

*Primary Examiner* — Monjour Rahim
(74) *Attorney, Agent, or Firm* — Dan Choi; Judy Yee; Micky Minhas

(57) ABSTRACT

A digital rights management license provides access to a decryption key that can be used to decrypt an encrypted digital content item. The digital rights management license also includes a policy that defines circumstances in which the decryption key is allowed to decrypt encrypted content data for the purpose of creating a persistently-unencrypted version of the content data.

19 Claims, 2 Drawing Sheets

(56) References Cited

OTHER PUBLICATIONS

Pitkanen, et al., "Towards a Digital Rights Management Framework", Retrieved at <<http://www.hiit.fi/~opp/pub/drm_framework_iec2000.pdf>>, pp. 12.

Seki, et al., "A Proposal on Open DRM System Coping with Both Benefits of Rights-Holders and Users", Retrieved at <<http://ieeexplore.ieee.org/stamp/stamp.jsp?arnumber=01259001>>, GLOBECOM 2003, pp. 4111-4115.

* cited by examiner

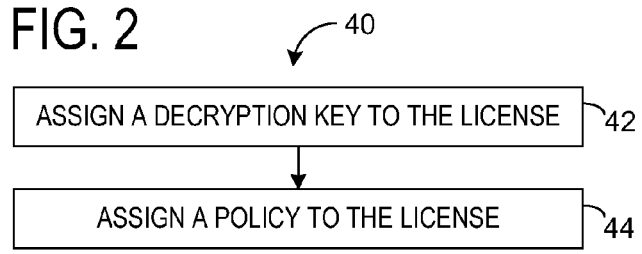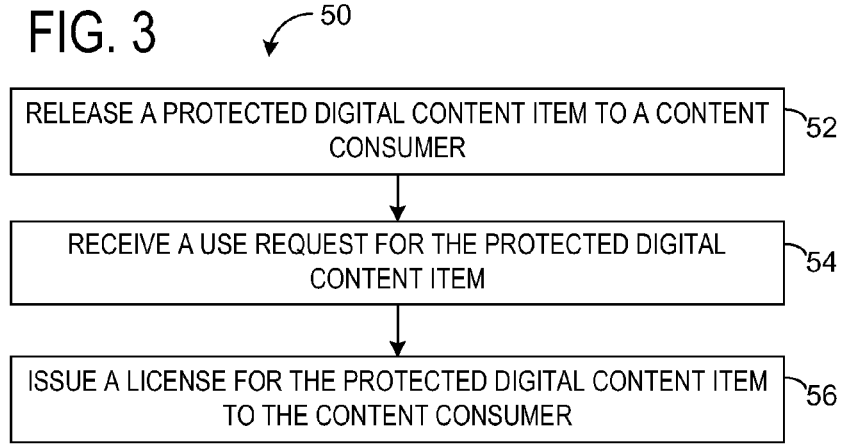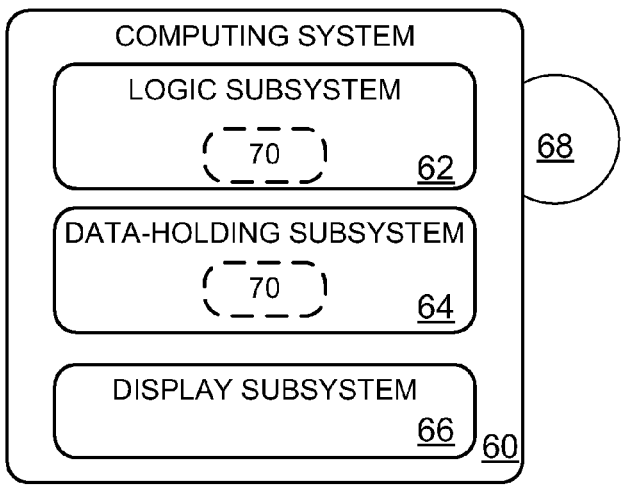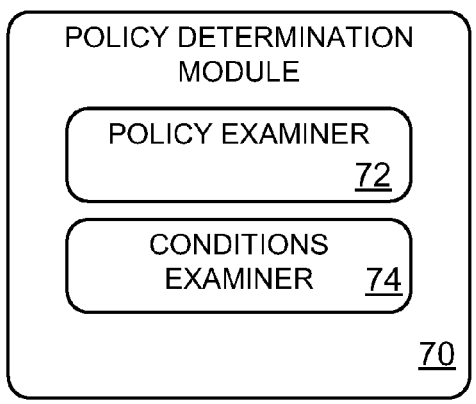

DIGITAL RIGHTS MANAGEMENT WITH PERSISTENTLY-UNENCRYPTED CONTENT

BACKGROUND

Digital content has become ubiquitous. Music, video, textual works, graphical works, games, and countless other types of content are saved in various digital formats. While digital formats offer many benefits, the ease with which exact duplicates can be made poses some challenges. In particular, because digital duplicates can be made without losing any quality and/or fidelity, it can be difficult to prevent the unauthorized copying and distribution of digital content.

SUMMARY

A digital rights management license is disclosed. The digital rights management license provides access to a decryption key that can be used to decrypt an encrypted digital content item. The digital rights management license also includes a policy that defines circumstances in which the decryption key is allowed to decrypt encrypted content data for the purpose of creating a persistently-unencrypted version of the content data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows a method of building a license for implementing digital rights management in accordance with an embodiment of the present disclosure.

FIG. 3 shows a method of distributing digital content in accordance with an embodiment of the present disclosure.

FIG. 4 shows a computing device in accordance with an embodiment of the present disclosure.

FIG. 5 shows an example policy determination module in accordance with an embodiment of the present disclosure.

DETAILED DESCRIPTION

Figure 1:
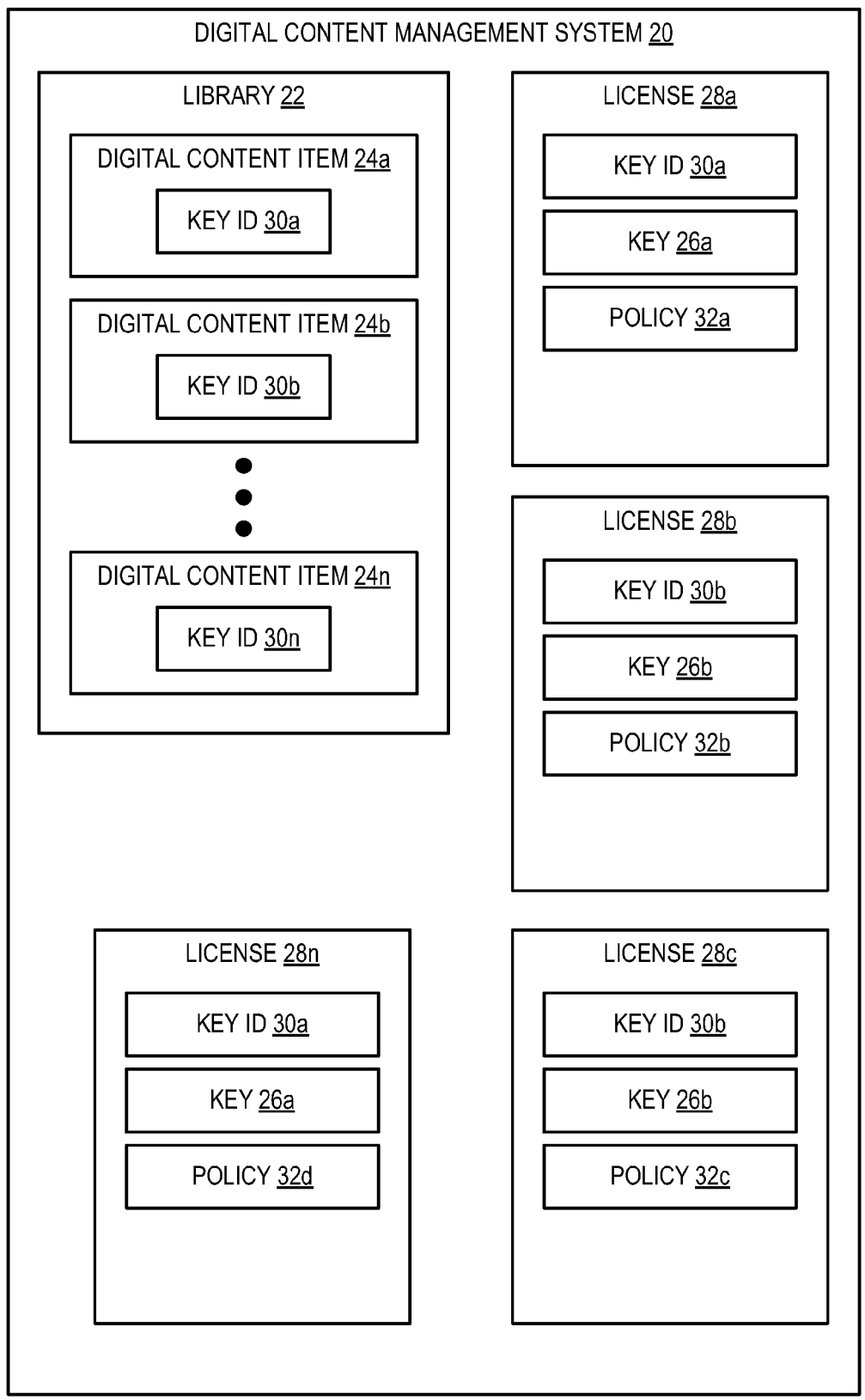
FIG. 1 schematically shows a digital rights management system in accordance with an embodiment of the present disclosure.

A digital rights management system and licenses that are used to help implement a digital rights management system are disclosed. In order to limit the unauthorized distribution and use of digital content, digital content may be encrypted with a cryptographic encryption key so that the digital content can be used only if decrypted with a corresponding symmetric cryptographic decryption key. The decryption key that can decrypt a particular digital content item may itself be encrypted with a public cryptographic key that corresponds to an asymmetric private cryptographic key that is issued to a particular user, device, domain, or other limited sample of potential content consumers. In this way, only the content consumers having access to an appropriate private cryptographic key may decrypt the cryptographic decryption key and thereby decrypt the encrypted digital content item.

FIG. 1 schematically shows a digital content management system 20 in accordance with an embodiment of the present disclosure. The digital content management system includes a library 22 of encrypted digital content items (e.g., digital content item 24a, digital content item 24b, and digital content item 24n). Library 22 may include virtually any number of digital content items, and the digital content items included in library 22 may be virtually any different type of digital content items.

The digital content items, or at least content portions thereof, may be encrypted so as to deter the unauthorized distribution and/or use of the digital content items. As such, for each encrypted digital content item, digital content management system 20 may include decryption keys configured to decrypt the encrypted digital content items. As shown in FIG. 1, such decryption keys (e.g., decryption key 26a and decryption key 26b) may be assigned to licenses (e.g., license 28a, license 28b, license 28c, and license 28n) that correspond to particular digital content items.

The digital content items and the licenses may both include content key identifiers (e.g., content key identifier 30a and content key identifier 30b) that allow licenses to be matched to corresponding content items. In the illustrated embodiment, license 28a and license 28n both correspond to content item 24a, as shown by matching content key identifier 30a; and license 28b and license 28c both correspond to content item 24b, as shown by matching content key identifier 30b.

As discussed above, each license may also include a policy (e.g., policy 32a, policy 32b, policy 32c, and policy 32d). The policy can define circumstances in which a particular one of the one or more content keys is allowed to decrypt an encrypted digital content item.

A license that is compatible with the digital content management system is a digital representation of the rights and restrictions a content consumer possesses with respect to the corresponding digital content item. The license may be held on a data-holding subsystem, such as a hard drive of a network accessible server and/or a local drive and/or memory of a user device. The license is formatted so as to be read and/or interpreted by one or more different applications compatible with the digital content management system. Such applications may enforce the policies of the license, and use the decryption key of the license to decrypt the digital content item for one or more purposes. Furthermore, applications that are not compatible with the digital content management system and/or are not trusted to enforce the policies of the license are not allowed to use the decryption key of the license to decrypt the digital content item.

The policy of the license may allow decryption for one or more different purposes and/or usages, such as decrypting for the purpose of playing the encrypted digital content, decrypting for the purpose of copying the encrypted digital content, decrypting for the purpose of executing the digital content, etc. Each purpose for which the digital content item may be decrypted corresponds to a right offered by the license. As such, the license is a digital representation of the rights associated with a particular digital content item for a particular device, domain, or other category of license recipient.

The policy of the license may also allow decryption when one or more conditions are satisfied. For example, a policy may allow decryption during a finite time duration (e.g., before an expiration date, and/or upon passing a predetermined date). As another example, a policy may allow only a finite number of decryptions (e.g., a digital content item may be limited to a set number of play counts). In other words, the rights offered by a license may have one or more parameters that further indicate the conditions under which decryption is allowed. The rights offered by a license may also have one or more restrictions that limit or govern decryption.

When a digital content item is protected under a digital rights management system in accordance with the present disclosure, a content consumer may utilize that digital content item after obtaining a license that includes a cryptographic decryption key for decrypting that digital content item. Once a license is acquired, it may be saved for convenient retrieval. As a nonlimiting example, a license may be saved on the same device on which the digital content item is saved.

A digital content item may include a pointer that directs a content consumer to a location at which a corresponding license may be acquired. In this way, if a content consumer does not currently have a relevant license, the content consumer may acquire the relevant license and thus decrypt the digital content item. As a nonlimiting example, a license acquisition server may be maintained for issuing licenses upon request. A license acquisition server can issue a license that includes an encrypted decryption key, so that only intended content consumers (e.g., device or domain) may use the license to decrypt the digital content item. A license acquisition server may be network accessible, such as via the Internet. In such cases, each digital content item may include a Uniform Resource Locator (URL) that points to the license acquisition server.

If circumstances ever arise in which a content consumer does not have access to a license and the license acquisition server is unavailable for providing a license, the content consumer will not be able to utilize the digital content item because the content consumer will not be able to decrypt the digital content item. This may cause significant user dissatisfaction. To avoid the potential for such user dissatisfaction, the digital content item may initially be released in an unprotected, unencrypted format. However, releasing the digital content item in an unprotected, unencrypted format defeats the purpose of digital rights management altogether. There are many scenarios in which a content provider may wish to release a digital content item in a protected, encrypted format, but subsequently allow a user to enjoy an unprotected, unencrypted version of the digital content item after one or more conditions have been satisfied. In this way, the protections of digital rights management are obtained during an initial period, and the risk of user dissatisfaction due to not being able to obtain a relevant license is lessened. Furthermore, users may find a digital content item that will eventually be unprotected to be more valuable than a digital content item that is perpetually protected.

A license may include a policy that allows decryption for the purpose of transforming the content portion of a protected digital content item into a persistently-unencrypted version of the content portion. In other words, the license may allow the creation/enablement of a digital content item that is not encrypted and does not have restrictions on playing, copying, executing, etc., even though such restrictions were in place in the protected (i.e., encrypted) digital content item.

As a nonlimiting example, a game may be released in a protected, encrypted format that deters the unauthorized copying of the game by individuals that have not paid for the game and thus do not have access to a valid license for the game. Such protection may deter copying during a period of initial interest in the game, when the majority of game sales take place. However, to lessen the risk of a game becoming unusable due to a content consumer not being able to obtain a new license, the license associated with the game may provide a content consumer with the right to decrypt the game for the purpose of creating a persistently-unencrypted version of the game. Such a right may only allow the creation/enablement of a persistently-unencrypted version of the game after a certain date, such as six months after the game's release.

As another nonlimiting example, a movie may be released to the box offices at the same time that it is released in a protected, encrypted format for home viewing (e.g., via DVD, HD-DVD, Blu-Ray, download or streaming service, etc.). The license associated with the movie may provide a content consumer with the right to decrypt the movie for viewing only if predetermined conditions are satisfied (e.g., the user has viewed advertisements and taken a survey). The license associated with the movie may further provide a content consumer with the right to decrypt the movie for the purpose of creating a persistently-unencrypted version only if predetermined conditions are satisfied (e.g., the advertisements and survey have been completed and the movie has been released for one year).

The right to decrypt a digital content item for the purpose of creating a persistently-unencrypted digital content item may be contingent on any number of predetermined conditions. As nonlimiting examples, the persistently-unencrypted version may be created after a certain date, after a certain number of uses, after a certain duration of use, after a user has completed certain tasks, etc. In some embodiments, different portions of the digital content may be allowed to be transformed into a persistently-unencrypted version after different predetermined conditions are satisfied. As an example, a movie may be transformed into a persistently-unencrypted version after a specified date, while a bonus material segment may be transformed into a persistently-unencrypted version only after the movie has been viewed a predetermined number of times.

FIG. 2 shows a method 40 of building a license for implementing digital rights management. At 42, method 40 includes assigning a decryption key to the license. The assigned decryption key is configured to decrypt content data encrypted by a symmetric encryption key, as described above. The assigned decryption key can be encrypted so that it can only be used by a predetermined content consumer (e.g., device or domain).

At 44, method 40 includes assigning a policy to the license. As described above, the policy includes an indication of the circumstances in which the decryption key is allowed to decrypt content data encrypted by the symmetric encryption key for the purpose of creating a persistently-unencrypted version of the content data.

FIG. 3 shows a method 50 of distributing digital content under a digital rights management system. At 52, method 50 includes releasing a protected digital content item to a content consumer. A variety of different types of content items may be released, including, but not limited to, games, movies, songs, and applications. The digital content items can be released on removable media, via network download, or via any other suitable method. The protected digital content items include a content portion that is encrypted, thus reducing the risk of unauthorized playback, copying, or other use.

At 54, method 50 includes receiving a use request for the protected digital content item. For example, a content consumer may attempt to play a song, copy a movie, or execute an application. Upon such an event, the application the user is using can look for a relevant license, and if a relevant license is not found, notify a license acquisition server or other license distributor.

At 56, method 50 includes issuing a license for the protected digital content item to the content consumer. As described above, such a license includes a policy defining one or more usage and/or decryption rights that may be granted to a content consumer. One such decryption right can be a make-persistent right to transform the content portion of the protected digital content item into a persistently-unencrypted version of the content portion, as described above.

In some embodiments, the above described methods and processes may be tied to a computing system. As an example, FIG. 4 schematically shows a computing system 60 that may perform one or more of the above described methods and processes. Computing system 60 includes a logic subsystem 62 and a data-holding subsystem 64. Computing system 60 may optionally include a display subsystem and/or other components not shown in FIG. 4.

Logic subsystem 62 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 64 may include one or more physical devices configured to hold data and/or instructions executable by the logic subsystem to implement the herein described methods and processes. When such methods and processes are implemented, the state of data-holding subsystem 64 may be transformed (e.g., to hold different data). Data-holding subsystem 64 may include removable media and/or built-in devices. Data-holding subsystem 64 may include optical memory devices, semiconductor memory devices, and/or magnetic memory devices, among others. Data-holding subsystem 64 may include devices with one or more of the following characteristics: volatile, nonvolatile, dynamic, static, read/write, read-only, random access, sequential access, location addressable, file addressable, and content addressable. In some embodiments, logic subsystem 62 and data-holding subsystem 64 may be integrated into one or more common devices, such as an application specific integrated circuit or a system on a chip.

FIG. 4 also shows an aspect of the data-holding subsystem in the form of computer-readable removable media 68, which may be used to store and/or transfer data and/or instructions executable to implement the herein described methods and processes.

When included, display subsystem 66 may be used to present a visual representation of data held by data-holding subsystem 64. As the herein described methods and processes change the data held by the data-holding subsystem, and thus transform the state of the data-holding subsystem, the state of display subsystem 66 may likewise be transformed to visually represent changes in the underlying data. Display subsystem 66 may include one or more display devices utilizing virtually any type of technology. Such display devices may be combined with logic subsystem 62 and/or data-holding subsystem 64 in a shared enclosure, or such display devices may be peripheral display devices.

FIG. 5 somewhat schematically shows a policy determination module 70, which may be used to determine if a persistently-unencrypted version of a content item is to be created. Such a policy determination module may be implemented as hardware, software, or a combination thereof, as shown in FIG. 4. In some embodiments, the policy determination module may be part of a client-side application configured to enforce a digital rights management system and configured to create a persistently-unencrypted version of a content item in accordance with the policy of that content item's license.

At 72, the policy determination module may include a policy examiner for reading the policy of a license associated with a content item of interest. The policy examiner can investigate whether the policy allows for the creation of a persistently-unencrypted version of a content item, and if so, under what conditions.

At 74, the policy determination module may include a conditions examiner. The conditions examiner may determine if contingent conditions for creating a persistently-unencrypted version of a content item have been satisfied. As a nonlimiting example, the conditions examiner may determine if a predetermined time duration has been reached (e.g., a date certain and/or a play/execution time). As another example, the conditions examiner may determine if a content item has been used a predetermine number of times. As yet another example, the conditions examiner may determine if a user has completed certain tasks. In general, the conditions examiner may be configured to assess and/or test any conditions upon which the making of a persistently-unencrypted version of a content item is contingent. In making such determinations, the conditions examiner may compare information stored on a user device and/or information stored on a network server to the policy of the license of interest.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of building a license for implementing digital rights management, the method comprising:
    assigning a decryption key to the license, the decryption key configured to decrypt content data encrypted by a symmetric encryption key; and
    assigning a policy to the license, the policy defining circumstances in which the decryption key is allowed to decrypt content data encrypted by the symmetric encryption key to create a persistently-unencrypted version of the content data contingent on one or more conditions.

2. The method of claim 1, where the policy enables the creation of the persistently-unencrypted version of the content data contingent on passing a predetermined date.

3. The method of claim 1, where the policy enables the creation of the persistently-unencrypted version of the content data contingent on using the content data for a predetermined duration.

4. The method of claim 1, where the policy enables the creation of the persistently-unencrypted version of the content data contingent on using the content data a predetermined number of times.

5. The method of claim 1, where the policy includes an indication of whether the license allows playback.

6. The method of claim 1, where the policy includes an indication of whether the license allows copying.

7. The method of claim 1, where the policy includes an indication of the content data to which the license applies.

8. The method of claim 1, where the policy includes an indication of when the license expires.

9. The method of claim 1, where the policy includes an indication of a device or domain to which the license is issued.

10. The method of claim 1, where the decryption key is itself encrypted with a public key so that only a device with a corresponding asymmetric private key can decrypt the decryption key and thereby decrypt the content data.

11. The method of claim 1, where the decryption key is itself encrypted with a public key so that only a device belonging to a domain having access to a corresponding asymmetric private key can decrypt the decryption key and thereby decrypt the content data.

12. The method of claim 1, further comprising assigning a key identifier to the license, the key identifier identifying which decryption key is assigned to the license.

13. A computing system including a logic subsystem and a data-holding subsystem holding a license, the license comprising:
- a decryption key configured to decrypt content data encrypted by a symmetric encryption key;
- a policy granting one or more decryption rights, including a make-persistent right defining circumstances in which the decryption key is allowed to decrypt content data encrypted by an asymmetric encryption key for a purpose of creating a persistently-unencrypted version of the content data;
- the data-holding subsystem further holding instructions executable by the logic subsystem to decrypt the encrypted content data with the decryption key in accordance with the policy, and to access the persistently-unencrypted version of the content data without the decryption key.

14. The data-holding subsystem of claim 13, where the policy enables the creation of the persistently-unencrypted version of the content data contingent on one or more conditions.

15. A method of distributing digital content, the method comprising:
- releasing a protected digital content item to a content consumer, the protected digital content item including a content portion that is encrypted;
- receiving a use request for the protected digital content item; and
- issuing a license for the protected digital content item to the content consumer, the license including a policy defining one or more decryption rights, including a make-persistent right to transform the content portion of the protected digital content item into a persistently-unencrypted version of the content portion.

16. The method of claim 15, where the policy enables creation of the persistently-unencrypted version of the content portion contingent on one or more conditions.

17. The method of claim 15, where the policy enables creation of the persistently-unencrypted version of the content portion contingent on passing a predetermined date.

18. The method of claim 15, where the policy enables creation of the persistently-unencrypted version of the content portion contingent on using the content portion for a predetermined duration.

19. The method of claim 15, where the policy enables creation of the persistently-unencrypted version of the content portion contingent on using the content portion a predetermined number of times.

* * * * *